(12) United States Patent
Gardner, Jr. et al.

(10) Patent No.: US 6,366,707 B1
(45) Date of Patent: Apr. 2, 2002

(54) IMAGING APPARATUS ALIGNMENT SYSTEM AND METHOD

(75) Inventors: Richard Lynn Gardner, Jr.; Robert W. Luffel, both of Greeley; Richard A. Irwin, Fort Collins, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/290,429

(22) Filed: Apr. 13, 1999

(51) Int. Cl.[7] .............................. G06K 9/36; G01B 9/00
(52) U.S. Cl. ........................................ 382/287; 356/124
(58) Field of Search .................................. 382/287, 289, 382/294; 356/124, 127; 359/1; 369/178; 250/208.1, 559.31

(56) References Cited

U.S. PATENT DOCUMENTS

| | | | | |
|---|---|---|---|---|
| 3,730,625 A | * | 5/1973 | Brayton ........................ | 356/28 |
| 4,688,933 A | * | 8/1987 | Lapeyre ........................ | 356/1 |
| 5,044,727 A | * | 9/1991 | Steinle ........................ | 350/171 |
| 5,430,286 A | * | 7/1995 | Hammond, Jr. et al. .... | 235/472 |
| 5,583,557 A | * | 12/1996 | Yamamoto et al. ......... | 347/235 |
| 5,644,559 A | | 7/1997 | Christie, Jr. et al. ......... | 369/36 |
| 5,646,394 A | * | 7/1997 | Steinle et al. ............ | 250/208.1 |
| 5,682,096 A | | 10/1997 | Christie, Jr. et al. ..... | 324/207.2 |
| 5,991,437 A | * | 11/1999 | Migdal et al. ............... | 382/154 |
| 6,005,666 A | * | 12/1999 | Dandliker et al. .......... | 356/355 |
| 6,008,964 A | * | 12/1999 | Goodknight et al. ......... | 360/92 |
| 6,111,847 A | * | 8/2000 | Assadian ..................... | 369/178 |

* cited by examiner

*Primary Examiner*—Leo Boudreau
*Assistant Examiner*—Kanji Patel

(57) ABSTRACT

An alignment system for an imaging apparatus is disclosed. The alignment system aligns the image beam associated with the imaging apparatus relative to predetermined reference points, such as the vertex and base of a right triangle. The base of the right triangle may be normal to the image beam and the vertex of the right triangle may be located at a fixed and predetermined location relative to the imaging apparatus. The image beam may intersect a hypotenuse point on the hypotenuse of the right triangle and the image beam may intersect a base point on the base of the right triangle. The alignment system measures the distance between the base point and the hypotenuse point. The distance between the base point and the hypotenuse point corresponds to a single location on the base relative to the vertex. The alignment systems, thus, references the transverse position of the image beam relative to the vertex. The alignment system also references the vertical position of the image beam relative to the location on the image beam where the image beam intersects the base.

28 Claims, 10 Drawing Sheets

```
              TO FIG. 6A                              TO FIG. 6A
```

```
                         ┌──────────────────┐
                         │    IS THE        │
              NO         │ IPC THE CORRECT  │
         ◄───────────────┤ NUMBER TO CORRESPOND TO AN │
                         │    IMAGE OF THE  │
                         │      TARGET?     │
                         └────────┬─────────┘
                                 YES
                                  ▼
                    ┌──────────────────────────┐
                    │   CONCLUDE THAT THE      │
                    │ TARGET HAS BEEN IMAGED   │
                    └──────────────┬───────────┘
                                   ▼
              ┌────────────────────────────────────────┐
              │        IMAGE HEIGHT EQUALS             │
              │ (IPC) × (DISTANCE BETWEEN PHOTODETECTORS) │
              └────────────────────┬───────────────────┘
                                   ▼
              ┌────────────────────────────────────────┐
              │       SCAN HEIGHT EQUALS               │
              │  (IMAGE HEIGHT) ÷ (MAGNIFICATION)      │
              └────────────────────┬───────────────────┘
                                   ▼
              ┌────────────────────────────────────────┐
              │ TRANSVERSE POSITION OF THE IMAGE BEAM  │
              │   RELATIVE TO THE TARGET VERTEX        │
              │ EQUALS THE SCAN HEIGHT DIVIDED BY      │
              │   THE TANGENT OF THE VERTEX ANGLE      │
              └────────────────────┬───────────────────┘
                                   ▼
              ┌────────────────────────────────────────┐
              │ VERTICAL POSITION OF THE IMAGE BEAM IS │
              │  REFERENCED FROM THE PHOTODETECTOR     │
              │     THAT IMAGED THE TARGET BASE        │
              └────────────────────────────────────────┘
```

*FIG. 6B*

IMAGING APPARATUS ALIGNMENT SYSTEM AND METHOD

FIELD OF THE INVENTION

The present invention relates generally to an imaging apparatus alignment system and method and, more particularly, to a system and method for aligning the image beam of an imaging apparatus of the type which may be used in an automated media exchanger.

BACKGROUND OF THE INVENTION

An automated media exchanger is a device generally comprising a media library, a media handler, and media players. The automated media exchanger stores media, e.g., digital linear tape cartridges, in the library. When the information contained on a particular piece of media is required by a user, the media handler extracts the media from the library, transports the media to a media player, and inserts the media into the media player. The media players are devices that convert the media to a usable format, e.g., the media players may be digital linear tape players as are known in the art. The automated media exchanger may also include an imaging apparatus affixed to the media handler wherein the imaging apparatus is used to identify the media. Bar codes that identify the media may, as an example, be affixed to the media and the imaging apparatus may be adapted to read the bar codes to identify the media in a conventional manner.

The library typically comprises a plurality of media magazines. The magazines are generally parallelepiped structures comprising a plurality of slots or openings that are adapted to hold the media. A user may fill the magazines with media and then the user may place the magazines into the library within the automated media exchanger. There is generally some tolerance between the magazines and the structures supporting the magazines in the media library, thus, the media may be located at imprecise locations relative to the automated media exchanger. Furthermore, the magazines may abut each other within the library, which creates additional tolerances that add to the imprecision in the location of the media. These tolerances accumulate to create a tolerance stack between the location of the media and the automated media exchanger. The location of the media relative to the automated media exchanger, thus, becomes more imprecise as the tolerance stack increases.

The process of moving media from the library to a media player involves moving the media handler to a position adjacent to a specific piece of media in a magazine. The media handler then moves to extract the media from a specified slot in the magazine where the media is held. The media handler then moves adjacent to a specified media player and inserts the media into the media player. Likewise, the media handler may extract media from a media player and insert the media into a specified slot in a magazine by reversing the above-described procedure. The insertion and extraction of the media into and out of the magazines and the media players requires that the media handler precisely contact the media. If the media handler does not precisely contact the media, damage may occur to the media, the library, the media handler, and the media players.

The imprecise location of the media relative to the media handler creates problems when the automated media exchanger moves media into or out of a magazine or a media player. For example, the imprecision impedes the ability of the media handler to quickly insert and extract media into and out of a magazine and a media player without the risk of damaging components in the automated media exchanger. In order to precisely contact the media, the media handler may have to slow down to orient itself relative to the media prior to contacting the media. The media handler may, as an example, have to physically sense the location of the media in order to orient itself, which increases the operating time of the automated media exchanger.

These problems may be partially resolved by aligning the previously described imaging apparatus, which may be affixed to the media handler, to the slots in the magazines and to other components in the automated media exchanger. An example of aligning an image beam associated with the imaging apparatus to the magazine slots, the media players, and other components in the automated media exchanger is described in the U.S. Patent application, Ser. No. 09/291,242 of Gardner et al. for GUIDANCE SYSTEM AND METHOD FOR AN AUTOMATED MEDIA EXCHANGER, concurrently filed herewith, which is hereby incorporated by reference for all that is disclosed therein.

Even when the image beam associated with the imaging apparatus is aligned to the components in the automated media exchanger, however, it is still possible that the media handler itself may not be properly aligned to these components. This improper alignment may be due to misalignment between the image beam associated with the imaging apparatus and the media handler. As previously described, proper alignment between the media handler and the magazine slots, and thus, the media, is critical in order for the media handler to successfully extract media from the magazine or to insert media into the magazine. Proper alignment between the media handler and the media players is also critical for media exchanges between the media handler and the media players.

Misalignment between the media handler and the aforementioned components may, for example, be caused by misalignment between the image beam associated with the imaging apparatus and the media handler, which may, in turn, be caused by variables in manufacturing or in assembly of the imaging apparatus and the media handler. Accordingly, although the alignment system and method of application, Ser. No. 09/291,242, previously referenced, enables the image beam associated with the imaging apparatus to be accurately aligned to the magazine slots and the media player, it is further necessary to align the image beam to the media handler in order to ensure that the media handler accurately aligns with the magazine slots and the media player.

Therefore, a need exists for an alignment system that will align the image beam associated with an imaging apparatus to the media handler to which the imaging apparatus is affixed.

SUMMARY OF THE INVENTION

An alignment system that aligns an image beam associated with an imaging apparatus is disclosed herein. The imaging apparatus may, as an example, be a bar code reader as is known in the art. The alignment system determines the transverse and vertical positions of the image beam relative to the imaging apparatus or relative to a structure supporting the imaging apparatus. The alignment system may comprise an alignment target of a predetermined size located at a predetermined position relative to the imaging apparatus. The imaging apparatus images the alignment target and performs an analysis based on the image of the alignment target to determine the position of the image beam relative to the alignment target.

The alignment target may comprise a first edge and a second edge, wherein the first edge and the second edge define boundaries of reflective difference. A first axis, constituting the image beam, intersects the first edge at a first point and the second edge at a second point. The distance between the first point and the second point corresponds to a specific location on a second axis. The alignment target may, as an example, be a right triangle where the first edge is the base of the right triangle and the second edge is the hypotenuse of the right triangle.

The alignment system measures the distance between the first point and the second point. Based on this distance, the alignment system is able to determine the transverse position of the image beam relative to the alignment target. The vertical position of the image beam may be referenced to the alignment target based on the location where the image beam intersects the first edge.

DETAILED DESCRIPTION OF THE INVENTION

Figure 1:
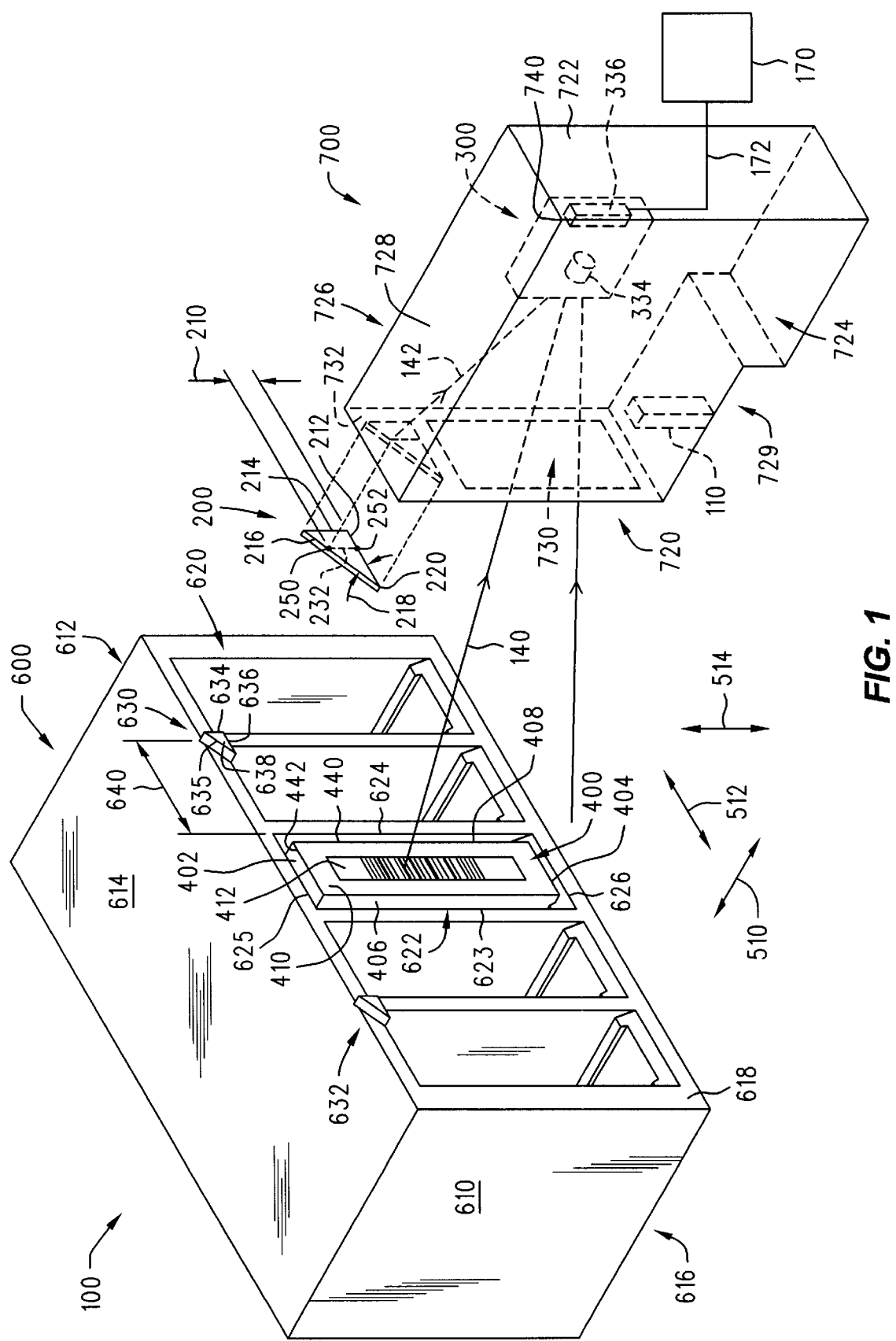
FIG. 1 is a top perspective view of an automated media exchanger incorporating an alignment system.

FIGS. 1 through 10, in general, illustrate an alignment system for an imaging apparatus 300. The alignment system comprises: a target 200 associated with the imaging apparatus 300; the target 200 comprising a first edge 212 and a second edge 216, the first edge 212 and the second edge 216 defining boundaries of reflective difference, wherein a first axis 232 intersects the first edge 212 at a first point 252 and the second edge 216 at a second point 250, and wherein the distance 210 between the first point 252 and the second point 250 corresponds to a location on a second axis.

FIGS. 1 through 10 also, in general, illustrate an alignment system for an imaging apparatus 300 wherein the imaging apparatus 300 is of the type comprising a photosensor 336, and a lens 334. The photosensor 336 comprises a linear array 354 of photodetectors 356. The lens 334 is located a predetermined distance 338 from the array 354 of photodetectors 356. The alignment system comprises a target 200 and a light source 110. The target 200 comprises a first edge 212 and a second edge 216. The first edge 212 and the second edge 216 define boundaries of reflective difference. A first axis 232 intersects the first edge 212 at a first point 252 and the second edge 216 at a second point 250. The distance 210 between the first point 252 and the second point 250 corresponds to a location on a second axis. The light source 110 is associated with the target 200.

FIGS. 1 through 10 also, in general, illustrate an automated media exchanger 100 of the type comprising an imaging apparatus 300. The automated media exchanger 100 comprising: an imaging apparatus 300 and a target 200 associated with the imaging apparatus 300. The target 200 is located at a predetermined location relative to the imaging apparatus 300. The target 200 comprises a first edge 212 and a second edge 216. The first edge 212 and the second edge 216 define boundaries of reflective difference. A first axis 232 intersects the first edge 212 at a first point 252 and the second edge 216 at a second point 250. The distance 210 between the first point 252 and the second point 250 corresponds to a location on a second axis.

FIGS. 1 through 10 also, in general, illustrate a method of aligning an imaging apparatus 300 comprising: providing a target 200 at a predetermined location relative to the imaging apparatus 300, the target 200 comprising a first edge 212 and a second edge 216, the first edge 212 and the second edge 216 first edge 212 at a first point 252 and the second edge 216 at a second point 250, and wherein the distance 210 between the first point 252 and the second point 250 corresponds to a location on a second axis; generating an image of the target 200 along the first axis 232 with the imaging apparatus 300; measuring a first length 210 between the first point 252 and the second point 250; and determining the location of an image beam 142 associated with the imaging apparatus 300 relative to the target 200 along a second axis based upon the first length 210.

Having thus described the alignment system and a method of aligning an imaging apparatus in general, the system and method will now be described in further detail.

FIG. 1 illustrates the components of an automated media exchanger 100 that are necessary to describe a process of aligning an image beam 142 that may be associated with the automated media exchanger 100. Specifically, the image beam 142 will be aligned to a media handler 700. The operation of the automated media exchanger 100 will be summarized below and a detailed operation of the automated media exchanger 100 will be described further below. The automated media exchanger 100 is a device that stores media in a media library and transports selected media pieces between the library and media players, not shown. The automated media exchanger 100 may comprise a media library, a media handler 700, an imaging apparatus 300, and media players, not shown. The media library may comprise a plurality of magazines, one of which is illustrated as the magazine 600. The automated media exchanger 100 illustrated in FIG. 1 is of the type that uses the imaging apparatus 300 to identify media that may be located in the magazine 600.

Except for the addition of the alignment target 200 and the imaging apparatus 300, as will be described in detail below, the automated media exchanger 100, including the components thereof, may, for example, be of the type commercially available from the Hewlett-Packard Company and sold as Model Number HP 4226w or of the type described in the following U.S. Pat. No. 5,644,559 of Christie, et al., for FLIP LATCH ASSEMBLY FOR MEDIA AUTOCHANGER; and No. 5,682,096 of Christie, et al., for METHOD AND APPARATUS FOR MONITORING OPERATING POSITIONS OF A MEDIA AUTOCHANGER, which are both hereby incorporated by reference for all that is disclosed therein.

The automated media exchanger 100 illustrated in FIG. 1 is depicted as being adapted to move digital linear tape cartridges between the magazine 600 and media players, not shown. It is to be understood, however, that the automated media exchanger 100 may be adapted to operate with other forms of media, such as compact discs.

The magazine 600 may comprise a plurality of slots 620 that are adapted to store digital linear tape cartridges. A slot 622 is illustrated in FIG. 1 as holding a digital linear tape cartridge 400. The digital linear tape cartridge 400 may have a top side 402, a bottom side 404, a left side 406, and a right side 408. These sides may define the boundaries of a front side 410 that faces out of the magazine 600. A right edge 440 may be defined by the boundary of the right side 408 and the front side 410. Additionally, a top edge 442 may be defined by the boundary of the top side 402 and the front side 410. A bar code 412 may be affixed to the front side 410. The bar code 412 serves to identify the digital linear tape cartridge 400 as is known in the art. The media handler 700 is a mobile device that transports digital linear tape cartridges between the magazine 600 and selected media players, not shown. The media handler 700 extracts specific digital linear tape cartridges from specific slots 620 in the magazine 600 and transports the digital linear tape cartridges to selected media players in a conventional manner. Likewise, the media handler 700 extracts digital linear tape cartridges from the media players and inserts the digital linear tape cartridges into selected slots 620 in the magazine 600.

An orientation system, not shown, may be affixed to the media handler 700 in a conventional manner. The orientation system is a separate system from the alignment system disclosed herein. The orientation system is able to determine the displacement of the media handler 700 from one point to another point within the automated media exchanger 100. The orientation system is, thus, able to determine the location of the media handler 700 relative to a predetermined location within the automated media exchanger 100. As will be described below, the digital linear tape cartridges stored in the magazine 600 are located at uncertain locations within the automated media exchanger 100, thus, the orientation system is not able to precisely determine the location of the media handler 700 relative to the digital linear tape cartridges.

The process of moving media from the library to a media player in a conventional automated media exchanger involves moving the media handler to a position adjacent to a specific piece of media in a magazine. The media handler then moves to extract the media from a specified slot in a specified magazine where the media is held. The media handler then moves adjacent to a specified media player and inserts the media into the media player. Likewise, the media handler may extract media from a media player and insert the media into a specified slot in a magazine by reversing the above-described procedure. The insertion and extraction of the media into and out of the magazines and the media players requires that the media handler precisely contact the media. If the media handler does not precisely contact the media, damage may occur to the media, the library, the media handler, and the media players.

Conventional automated media exchangers have problems aligning the media handler to the magazines and, thus, the media located in the magazines. These alignment problems are due to tolerances between the magazines and the structures supporting the magazines in the media library. The tolerance problems may be aggregated if the magazines abut each other within the library. Abutting magazines tend to create additional tolerances that add to the imprecision in the location of the media. These tolerances accumulate to create a tolerance stack between the location of the media and the automated media exchanger. The location of the media with reference to the automated media exchanger and, thus, the media handler becomes more imprecise as the tolerance stack increases.

The above-described tolerance problems may be resolved by aligning the media handler 700 to the slots 620 in the magazine 600. This alignment may be achieved by aligning the image beam 142 associated with the imaging apparatus 300 to the slots 620 in the magazine 600 and to the media handler 700. The above-described tolerance problems may, thus, be resolved by a two part alignment, wherein the first part aligns the image beam 142 to the media handler 700 and the second part aligns the image beam 142 to the slots 620 in the magazine 600.

An example of aligning the image beam 142 to the magazine slots 620, the media players, and other components located in the automated media exchanger 100 is described in the U.S. patent application, Ser. No. 09/291,242 of Gardner et al., previously referenced. The alignment systems disclosed herein performs the first part of the alignment procedure by aligning the image beam 142 to the media handler 700.

The automated media exchanger 100 illustrated in FIG. 1 aligns the image beam 142 to the media handler 700, thus, partially alleviating the above-described problems associated with conventional automated media exchangers. An alignment target 200 is located at a predetermined location relative to the media handler 700. The alignment target 200 is an optical indicium that is able to be detected by the imaging apparatus 300. The alignment target 200 is located so that the image beam 142 intersects the alignment target 200. The alignment target 200 is also appropriately located in the depth of field of the imaging apparatus 300 so that the imaging apparatus 300 may measure the size of the alignment target 200. Through measurements of the alignment target 200, as will be described in detail below, the automated media exchanger 100 is able to determine the precise location of the image beam 142 relative to the predetermined location of the alignment target 200.

Having summarized the automated media exchanger 100 and the alignment process, they will now be described in further detail below. The alignment process described herein focuses on extracting the digital linear tape cartridge 400 from the slot 622. It is to be understood, however, that this process is also applicable to inserting a digital linear tape cartridge into a slot and inserting and extracting a digital linear tape cartridge into and out of a media player.

FIG. 1 illustrates a top perspective view of the automated media exchanger 100. For the purpose of illustration, only the components that relate to the general operation of the automated media exchanger 100 and the alignment of the image beam 142 are illustrated in FIG. 1. Specifically, FIG. 1 illustrates the automated media exchanger 100 having a media magazine 600, a media handler 700, an imaging apparatus 300, an alignment target 200, and a processor 170. Media players associated with the automated media exchanger 100 are not illustrated herein.

The magazine 600 may be a parallelepiped structure having a left side 610, a right side 612, a top side 614, a bottom side 616, a front side 618, and a back side, not shown. The front side 618 may comprise a series of slots 620. The slots 620 may be openings adapted to hold media, such as optical discs, magnetic media, and digital linear tape cartridges.

A slot 622 in the magazine 600 is illustrated holding a digital linear tape cartridge 400. The slot 622 may be defined by a left side 623, a right side 624, a top side 625, and a bottom side 626. The digital linear tape cartridge 400 may have a top side 402, a bottom side 404, a left side 406, and a right side 408. These sides may define the boundaries of a front side 410 that faces out of the slot 622. The sides of the digital linear tape cartridge 400 may be located at predetermined distances from the sides of the slot 622. The border between the right side 408 and the front side 410 may form a right edge 440. The border of the top side 402 and the front side 410 may form a top edge 442. A bar code 412 may be affixed to the front side 410. The bar code 412 serves to identify the digital linear tape cartridge 400 as is known in the art. The bar code 412 may, for example, conform to the industry standard specification known as "Code 39."

Two guidance targets 630 and 632 may be affixed to predetermined locations on the front side 618 of the magazine 600. The guidance targets 630 and 632 are optical indicia used by the automated media exchanger 100 to align the image beam 142 to the slots 620 in the magazine 600. The guidance targets 630 and 632 are located at predetermined distances from the slots 620 and, thus, digital linear tape cartridges that may be stored in the slots 620. The function of the guidance targets 630 and 632 is described in the U.S. patent application, Ser. No. 09/291,242, previously referenced.

For the purpose of illustration, the automated media exchanger 100 will be described using only the guidance target 630. The guidance target 630 may be shaped as a right triangle having a height 634, a hypotenuse 635, and a base 636. The height 634, the hypotenuse 635, and the base 636 may define a surface 638 wherein the surface 638 may be substantially reflective. The height 634 may be located a predetermined transverse distance 640 from the right side 624 of the slot 622. For illustration purposes, the transverse distance 640 may be assumed to be 3 centimeters.

The media handler 700 may be a generally parallelepiped structure. The media handler 700 may have a front side 720, a back side 722, a left side 724, a right side 726, a top side 728, and a bottom side 729. The media handler 700 is illustrated in FIG. 1 with the left side 724 open to provide a view of the interior of the media handler 700. The media handler 700 may have a corner 740 defined by the intersection of the back side 722, the left side 724, and the top side 728. The imaging apparatus 300 may be affixed to the left side 724 of the interior of the media handler 700 in the vicinity of the corner 740. The front side 720 may have an opening 730. The opening 730 may be appropriately sized to allow the digital linear tape cartridge 400 to pass through the opening 730 and into the interior of the media handler 700. The front side 720 may also have a lip 732 extending between the top side 728 and the opening 730. The alignment target 200 may be affixed to the lip 732 so as to face into the interior of the media handler 700. The alignment target 200 illustrated in FIG. 1 has been greatly enlarged in order to better illustrate the alignment procedure.

A servo system, not shown, may be affixed to the media handler 700 in a conventional manner. The servo system may serve to move the media handler 700 in a plunge direction 510, a transverse direction 512, and a vertical direction 514 in a conventional manner. The plunge direction 510 may be defined as a direction that is normal to the front side 618 of the magazine 600. The transverse direction 512 may be defined as a direction that is parallel to the front side 618 of the magazine 600 and generally extends between the left side 610 and the right side 612 of the magazine 600. The vertical direction 514 may be defined as a direction that is perpendicular to both the plunge direction 510 and the transverse direction 512. The transverse direction 512 and the vertical direction 514 will also be used as reference positions to define the transverse position 512 and the vertical position 514 of the image beam 142.

The light source 110 may be affixed to the left side 724 of the interior of the media handler 700. The light source 110 may be located in the media handler 700 so that it will not interfere with a digital linear tape cartridge that may also be located in the interior of the media handler 700. Examples of light sources that may be used in the media handler 700 are disclosed in the following U.S. patent applications: Ser. No. 09/290,842 of Gardner for OPTICAL ASSEMBLY HAVING LENS OFFSET FROM OPTICAL AXIS, concurrently filed herewith; and Ser. No. 09/292,781 of Gardner for LOW POWER ILLUMINATOR, concurrently filed herewith; which are both hereby incorporated by reference for all that is disclosed therein.

Figure 2:
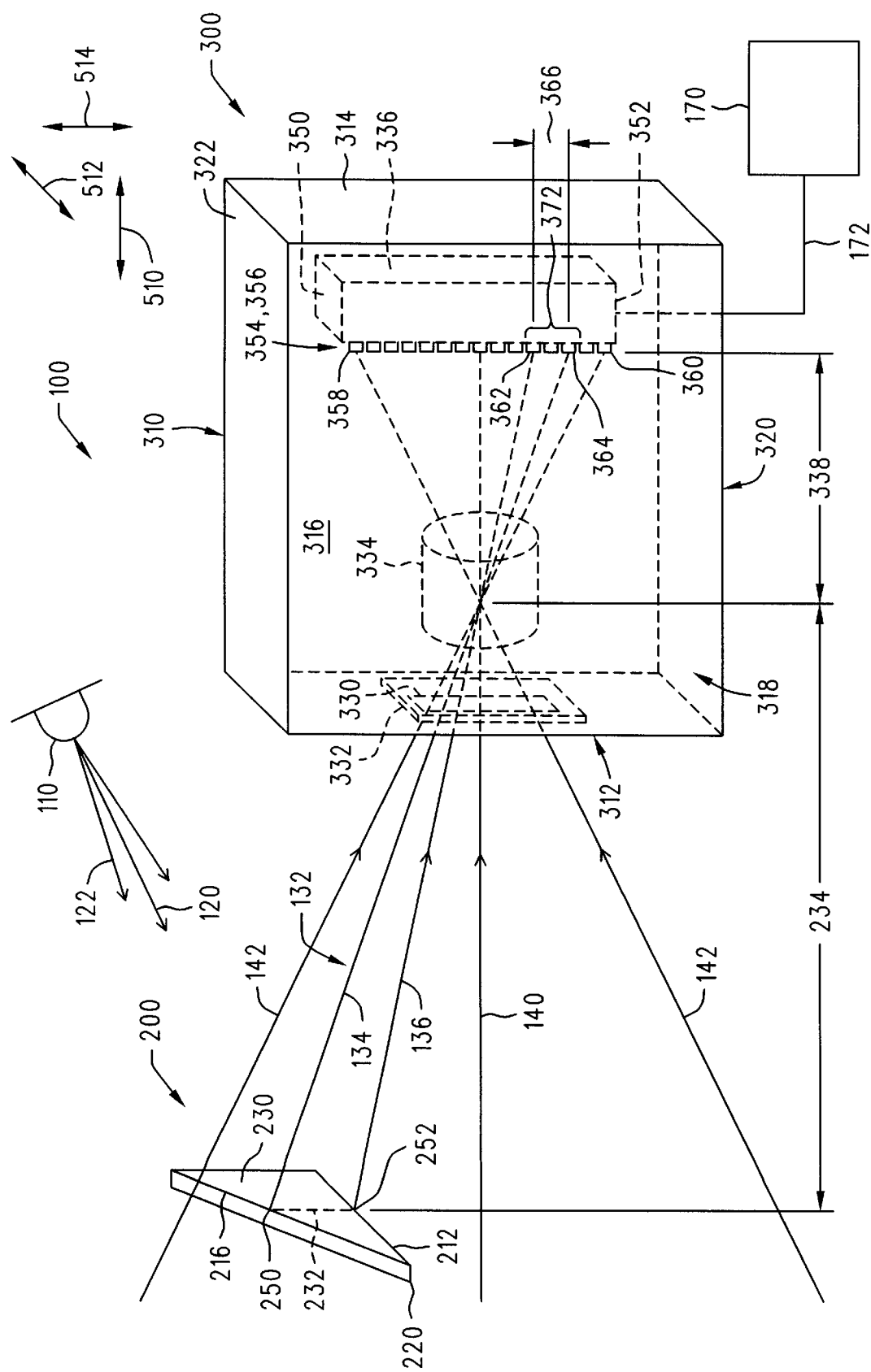
FIG. 2 is a side perspective view of the automated media exchanger of FIG. 1 illustrating an imaging apparatus, an image beam, and an alignment target.

FIG. 2 is a side perspective view of the automated media exchanger 100 of FIG. 1 with the magazine and the media handler removed from the view. FIG. 2 is provided to illustrate the association between the imaging apparatus 300 and the alignment target 200 in detail. FIG. 2 further illustrates the light paths and light beams that may be present in the automated media exchanger 100. The light source 110 as illustrated in FIG. 2 has been moved to an elevated position to better illustrate the light paths and beams associated with the imaging apparatus 300. An incident light path 120 may extend between the light source 110 and the alignment target 200. An incident beam 122 may follow the incident light path 120 from the light source 110 to the alignment target 200. An image light path 140 may extend between a point external to the imaging apparatus 300 and the imaging apparatus 300. The image beam 142 may follow the image light path 140 from points external to the imaging apparatus 300 to the imaging apparatus 300. These light beams and light paths as well as other light beams will be described in further detail below.

The imaging apparatus 300 illustrated in FIG. 2 may comprise a generally parallelepiped housing 310 having a front side 312, a back side 314, a right side 316, a left side 318, a bottom side 320, and a top side 322. The left side 318 is illustrated in FIG. 1 as being open in order to view the components located within the housing 310.

The front side 312 of the housing 310 may have an opening 330, which may serve to allow light to enter the housing 310. The light that enters the housing 310 may be the image beam 142. The image beam 142 may constitute an image of the target 200, which the imaging apparatus 300 will convert to image data as will be described in detail below. The interior of the housing 310 may have a window 332, a lens 334 and a photosensor 336. The window 332 may be located in the opening 330 and may serve to keep contaminates from entering the housing 310. The window 332 may, as an example, be a pane of transparent material. Additionally, the window 332 may be a pane of material that is transparent to a selected band of light frequencies and may, thus, serve as an optical filter.

The photosensor 336 may be located in the housing 310 in the vicinity of the back side 314 of the housing 310. The photosensor 336 serves to convert light to image data. The photosensor 336 is described herein as being a charge-coupled device as is known in the art. It is to be understood, however, that other photosensor devices that convert light to image data may be substituted for the charge-coupled device described herein. The photosensor 336 may have a first end 350 and a second end 352 with an array 354 of photodetectors 356 extending between the first end 350 and the second end 352. The array 354 of photodetectors 356 may face toward the opening 330 in the front side 312 of the housing 310. The array 354 of photodetectors 356 may have a first photodetector 358 located in the proximity of the first end 350 of the photosensor 336. The array 354 of photodetectors 356 may also have a last photodetector 360 located in the proximity of the second end 352 of the photosensor 336. The array 354 of photodetectors 356 may be approximately three centimeters in length between the first photodetector 358 and the last photodetector 360 and there may be approximately 2,700 photodetectors 356 in the array 354. The individual photodetectors 356 may have a width of approximately 11 microns, thus, the width of the array 354 may also be approximately 11 microns. The photodetectors 356 are depicted in FIG. 2 as being greatly enlarged in order to better illustrate the operation of the photosensor 336. One example of a commercially available photosensor is available from the NEC Corporation and is sold as model number 3734ACY.

The individual photodetectors 356 convert discrete points of light in the image beam 142 to image data. The image data from an individual photodetector 356 may, as an example, be a voltage wherein the voltage corresponds to the intensity of light received by the photodetector 356. As an example of the image data, photodetectors 356 that receive high intensities of light may output high voltages and photodetectors 356 that receive low intensities of light may output low voltages. The image data output by the photosensor 336 may be the cumulation of all the voltage outputs from all the photodetectors 356. The photodetectors 356 may be able to best convert a specific frequency band of light to image data. The other optical components used in the automated media exchanger 100 may be adapted to respond best to this frequency band of light. For example, the light source 110 may emit light in this frequency band and the window 332 may best pass light that is in this frequency band.

The photosensor 336 may be electrically connected to the processor 170 by a data line 172. The processor 170 may analyze the image data output from the photosensor 336 in order to align the image beam 142 as will be described in detail below. The processor 170 may also be connected to the servo system, not shown. The processor 170 may also instruct the servo system to move the media handler 700, FIG. 1, to specific locations within the automated media exchanger 100 for the purpose of identifying and extracting specific digital linear tape cartridges. Additionally, the processor 700 may be electrically connected to the orientation system, not shown. The orientation system may serve to output data corresponding to the location of the media handler 700, FIG. 1, relative to a predetermined location within the automated media exchanger 100.

Referring again to FIG. 2, the lens 334 may be located between the window 332 and the photosensor 336. Specifically, the lens 334 may be located an image distance 338 from the photosensor 336. The lens 334 may also be located a predetermined target distance 234 from the alignment target 200. The lens 334 may serve to focus the image beam 142 onto the photosensor 336. An example of the lens 334 that may be used in the imaging apparatus 300 is commonly known in the art as a Cooke triplet. Further examples of lenses that may be used in the imaging apparatus 300 are disclosed in the following U.S. patent applications: Ser. No. 09/290,429 of Gardner et al. for IMAGING APPARATUS ALIGNMENT SYSTEM AND METHOD, concurrently filed herewith; Ser. No. 09/290,216 of Gardner for ALIGNMENT APPARATUS AND METHOD FOR AN IMAGING SYSTEM, concurrently filed herewith; Ser. No. 09/290,949 of Gardner for METHOD AND APPARATUS FOR SETTING FOCUS IN AN IMAGING DEVICE, concurrently filed herewith; which are all hereby incorporated by reference for all that is disclosed therein; and Ser. No. 09/292,781 of Gardner, previously referenced.

The imaging apparatus 300 has a magnification, which is the ratio of the length of an image of an object as it appears on the photosensor 336 to the actual length of the object that produced the image. The magnification of the imaging apparatus 300 will be used by the processor 170 during the alignment of the image beam 142. The magnification of the imaging apparatus 300 may be calculated using known optical measurements and formulas. The magnification may also be determined by using a calibration system disclosed in the following U.S. patent application, which is hereby incorporated by reference for all that is disclosed therein, Ser. No. 09/290,807, for CALIBRATION SYSTEM FOR AN IMAGING APPARATUS AND METHOD of Gardner, et al., concurrently filed herewith.

The location of the image beam 142 relative to the automated media exchanger 100 may be defined by the transverse position 512 and the vertical position 514 as previously described. The placement of the photosensor 336 and the lens 334 in the imaging apparatus 300 affects the transverse position 512 and vertical position 514 of the image beam 142 relative to the imaging apparatus 300 and the media handler 700. The location of the image beam 142 relative to the media handler 700 may further be affected by imprecision in affixing the imaging apparatus 300 to the media handler 700, FIG. 1. The automated media exchanger 100 will determine the transverse position 512 and vertical position 514 of the image beam 142 relative to the media handler 700, irrespective of imprecision in affixing the imaging apparatus 300 to the media handler 700 or imprecision in the location of the lens 334 or the photosensor 336.

Figure 3:
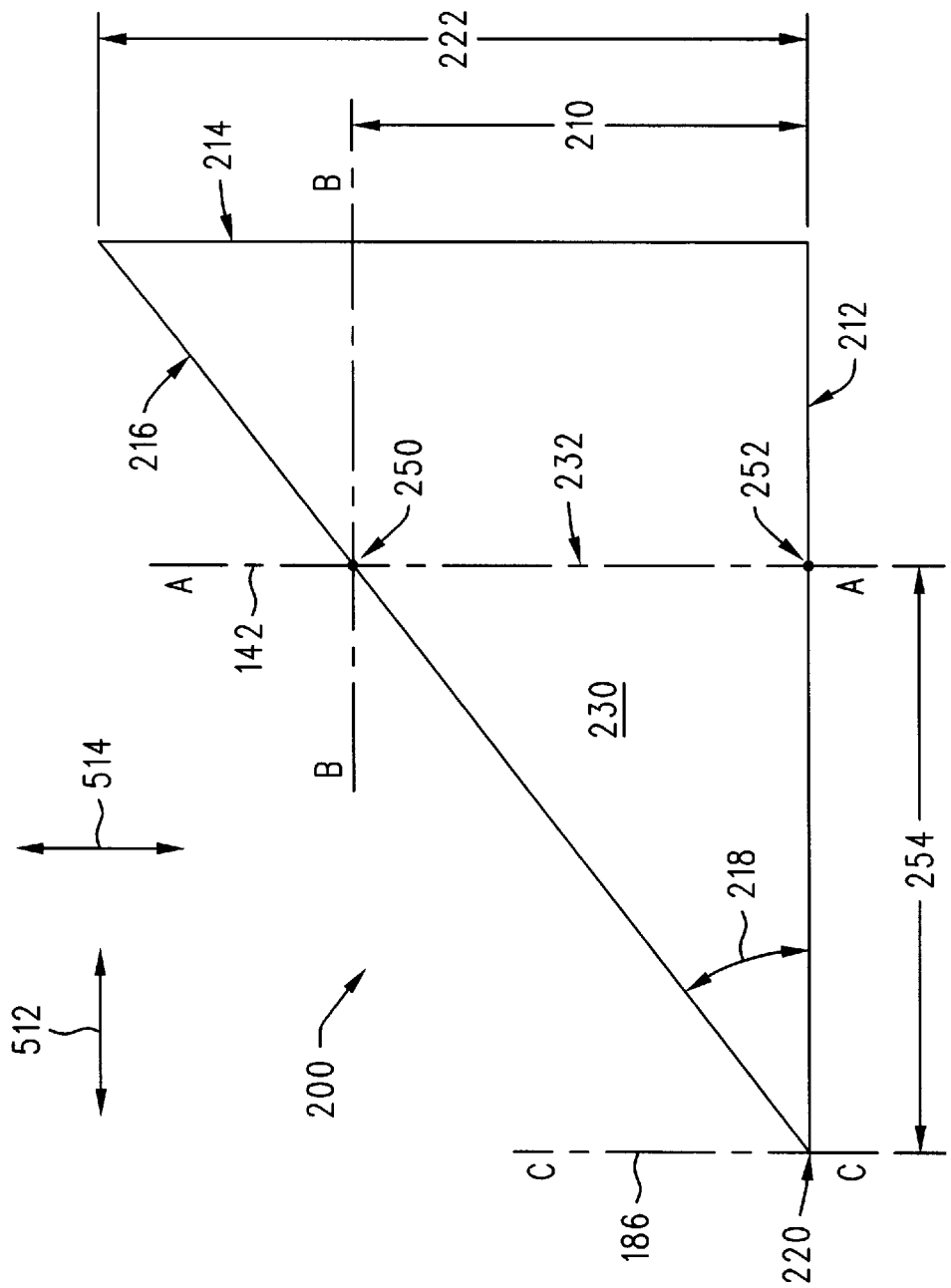
FIG. 3 is a front view of the alignment target of FIG. 2 wherein the alignment target is shaped as a right triangle.

FIG. 3 illustrates a front view of the alignment target 200. FIG. 3 provides an enlarged view of the alignment target 200 illustrated in FIGS. 1 and 2. The alignment target 200 may be in the shape of a right triangle having a target base 212, a target height 214, and a target hypotenuse 216. The target height 214 may have a length 222 extending between the target hypotenuse 216 and the target base 212. The target base 212 may be perpendicular to the target height 214. The target base 212 and the target hypotenuse 216 may intersect at a vertex 220 to form an angle θ, depicted numerically as 218. The alignment target 200 may have a surface 230, where the shape of the surface 230 is the right triangle defined by the boundaries of the target base 212, the target height 214 and the target hypotenuse 216. The surface 230 may be substantially reflective and the reflectivity of the surface 230 may be substantially uniform, e.g., the surface 230 may be light-colored and flat.

The image beam 142 illustrated in FIG. 2 may intersect the surface 230 of the alignment target 200 illustrated in FIG. 3. The image beam 142 is illustrated in FIG. 3 by a reference line AA. The image beam 142 may be approximately parallel to the target height 214 and may be approximately perpendicular to the target base 212. The image beam 142 may intersect the target hypotenuse 216 at a hypotenuse point 250. The image beam 142 may also intersect the target base 212 at a base point 252. The base point 252 may be located a base distance 254 from the vertex 220. A scan line portion 232 may be defined as the portion of the image beam 142 that intersects the surface 230 of the alignment target 200 between the hypotenuse point 250 and the base point 252. The scan line portion 232 may have a scan height 210 where the scan height 210 is the distance between the hypotenuse point 250 and the base point 252.

A base distance 254 is the distance between the vertex 220 and the base point 252. The base distance 254 is, thus, the distance between the vertex 220 and the image beam 142 along an axis defined by the target base 212. The base distance 254 will be determined in order to align the image beam 142 to the vertex 220. When the base distance 254 is determined, the transverse position 512 of the image beam 142 may be readily referenced as being located the base distance 254 from the vertex 220. The automated media exchanger 100 will use the scan height 210 to calculate the base distance 254. The base distance 254 is related to the scan height 210 by the equation:

$$\text{scan distance}(254) = \frac{\text{scan height}(210)}{\tan\theta\,(218)}$$

Referring again to FIG. 1, the alignment target 200 may be affixed to the lip 732 on the front side 720 of the media handler 700 so as to face the interior of the media handler 700. The alignment target 200 may be positioned at a predetermined location on the lip 732, which may serve as a reference location to align the image beam 142 to the media handler 700. Specifically, the target base 214 may serve as a reference location to align the vertical position 514 of the image beam 142 and the vertex 220 may serve as a reference location to align the transverse position 512 of the image beam 142.

The surface 230 of the alignment target 200 may be substantially reflective, e.g., the target may have a light-colored surface. The lip 732 may be substantially nonreflective, e.g., the lip 732 may have a dark-colored surface. Thus, the optical transition from the lip 732 to the alignment target 200 may be an area of reflective contrast that may be detected by the imaging apparatus 300 and the processor 170. The image of the scan line 232 of the target 200 located on the lip 732 of the media handler 700 may be a relatively intense section of light bounded by less intense sections of light. The relatively intense section of light corresponds to the scan line 232 of the target 200 and the relatively less intense sections of light correspond to the images of the lip 732 on either side of the target 200.

Referring again to FIG. 2, as was previously described, the automated media exchanger 100 may comprise a plurality of light beams and light paths that will now be described in detail. As was previously described, the light source 110 may emit an incident beam 122. The incident beam 122 may follow the incident light path 120 from the light source 110 to the alignment target 200, and may serve to illuminate the alignment target 200.

The image light path 140 may extend from points external to the imaging apparatus 300, to the imaging apparatus 300, through the opening 330, through the window 332, through the lens 334, and may terminate on the array 354 of photodetectors 356. The image beam 142 may follow the image light path 140 into the imaging apparatus 300 where the lens 334 may focus the image beam 142 onto the photodetectors 356. The photodetectors 356 may convert the intensities of light of discrete locations in the image beam 142 to image data. The output of each photodetector 356 may, thus, correspond to the light intensity of discrete locations of the image beam 142. For the purposes of applying mathematical equations to the the image beam 142, the image beam 142 may be interpreted as being an infinitely thin fan-shaped plane.

A reflection light beam 132 may reflect from the alignment target 200 and may extend to the imaging apparatus 300. The reflection light beam 132 may be a constituent of the image light beam 142. The reflection light beam 132 may be described as being bounded by two light beams, a hypotenuse beam 134 and a base beam 136. The hypotenuse beam 134 may extend between the hypotenuse point 250 on the alignment target 200 and a hypotenuse photodetector 364. The base beam 136 may extend between the base point 252 on the alignment target 200 and a base photodetector 362. The photodetectors from the base photodetector 362 to the hypotenuse photodetector 364 are referred to herein as the target photodetectors 372. The distance from the base photodetector 362 to the hypotenuse photodetector 364 is referred to herein as the image length 366.

Having thus described the automated media exchanger 100, the association between the alignment target 200 and the imaging apparatus 300 will now be described. A process of aligning the image beam 142 to the alignment target 200 and, thus, the media handler 700, will be described in detail further below.

Figure 4:
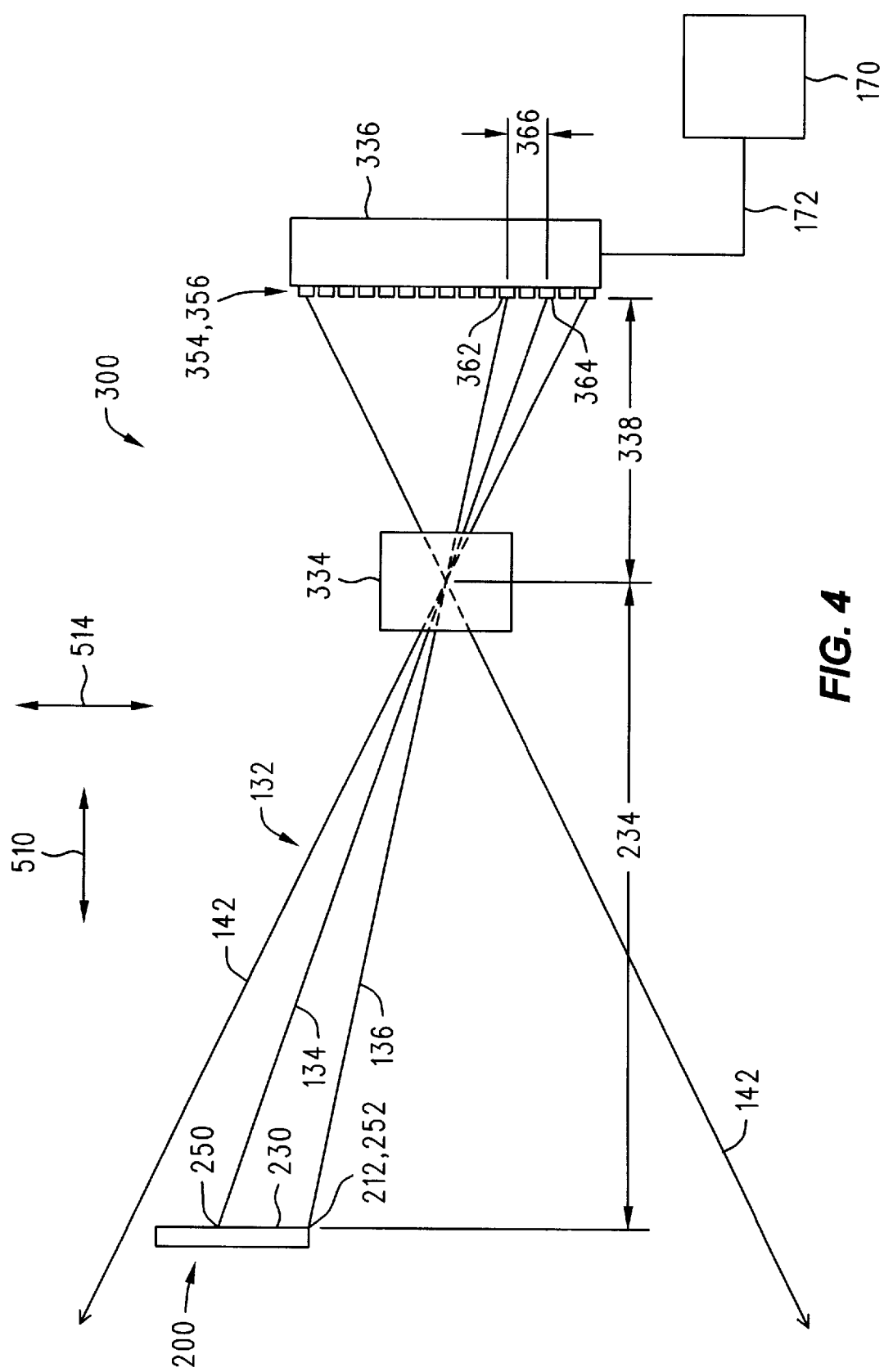
FIG. 4 is a side view of the automated media exchanger of FIG. 2 illustrating the vertical position of the image beam.
Figure 5:
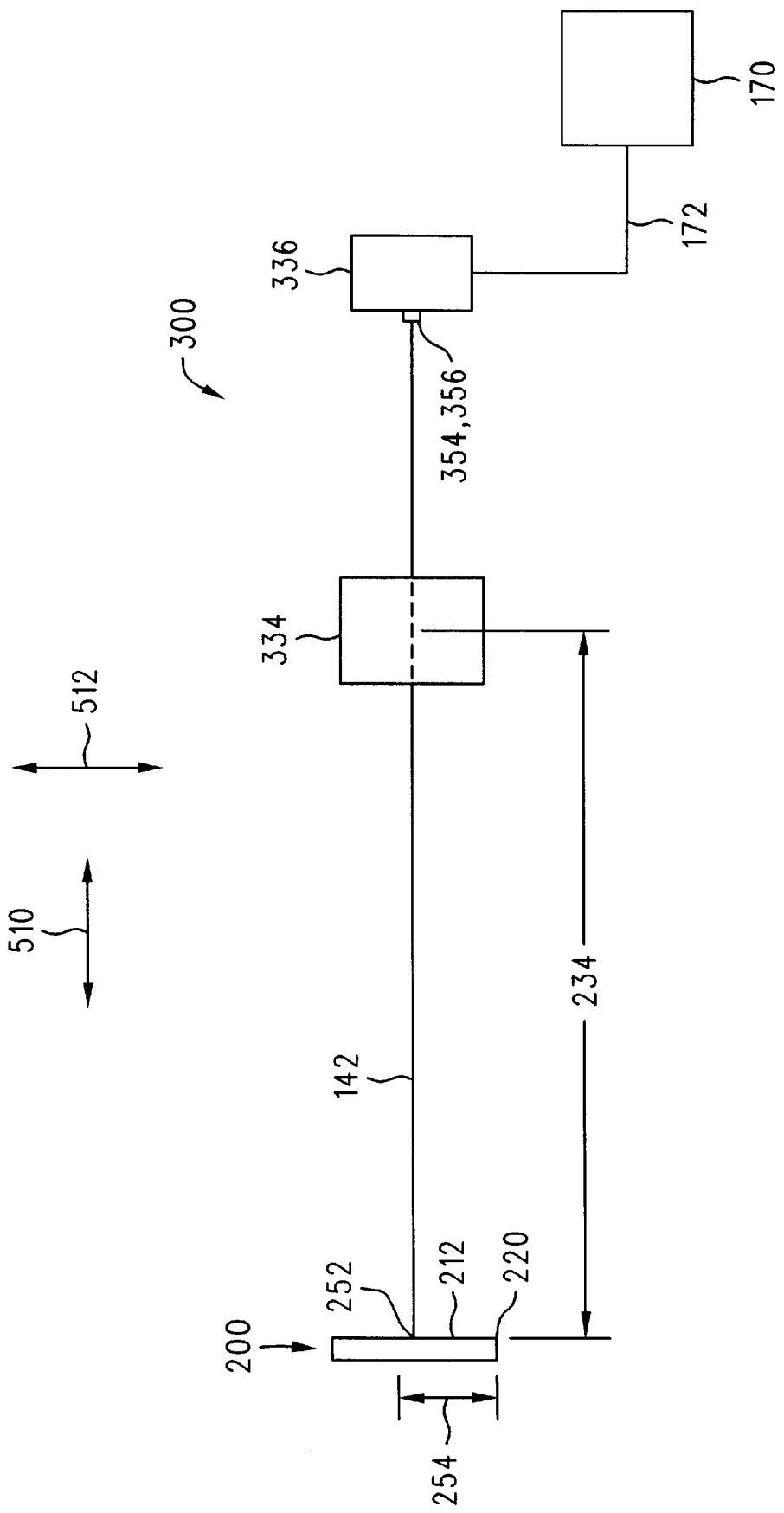
FIG. 5 is a top view of the automated media exchanger of FIG. 2 depicting the transverse position of the image beam.
Figure 6A:
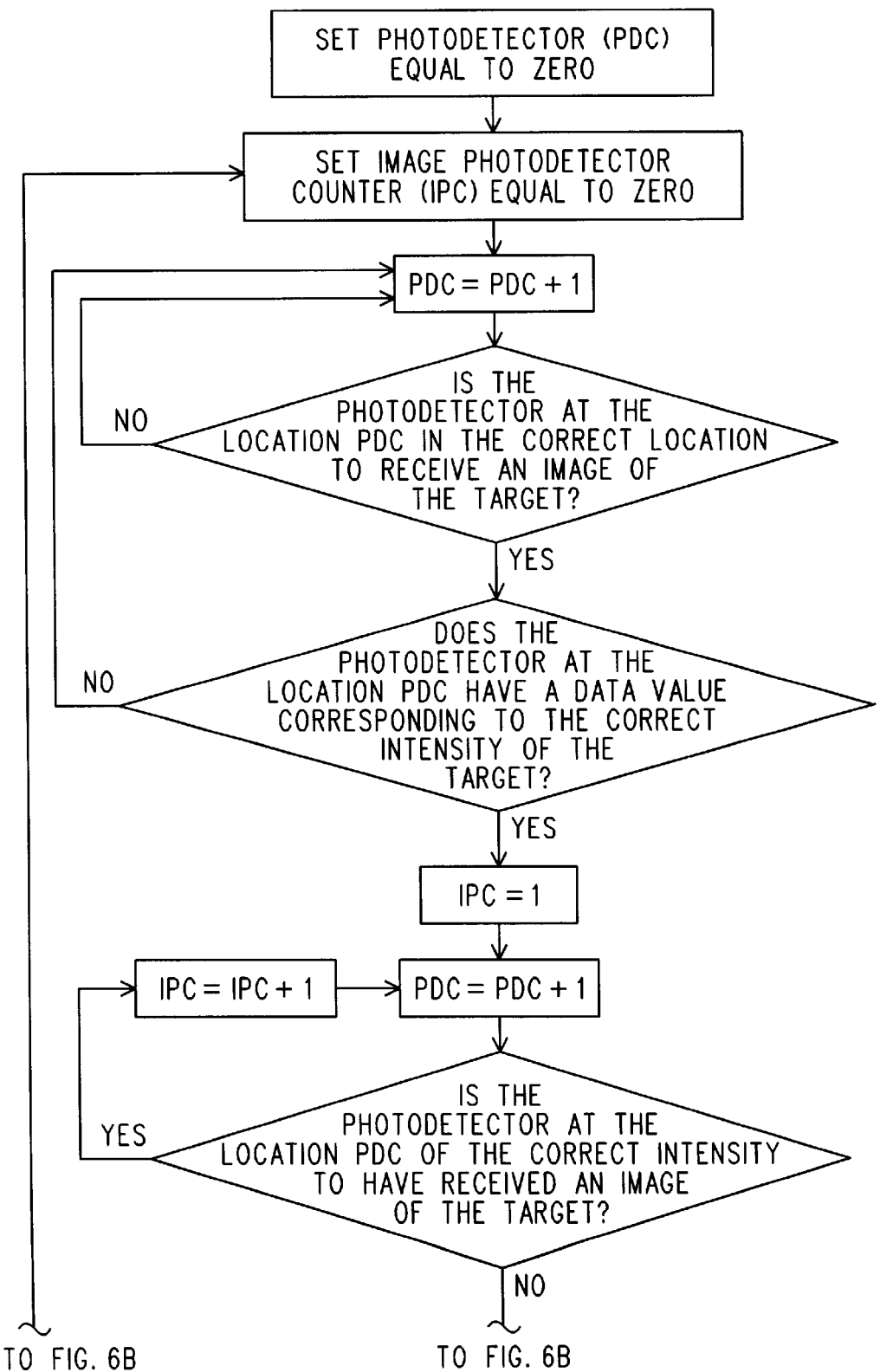
FIG. 6 is a flow chart illustrating a method of aligning an imaging apparatus.

FIGS. 4 and 5 have been provided to illustrate the association between the imaging apparatus 300 and the alignment target 200 in detail. FIG. 4 is a side view of the components comprising the imaging apparatus 300 and the calibration target 200, including the image beam 142. The housing of the imaging apparatus 300 has been removed from the view of FIG. 4 to better illustrate the interaction between the components comprising the imaging apparatus 300 and the calibration target 200. FIG. 4 is provided to illustrate the association between the image beam 142 and the alignment target 200 with respect to the vertical position 514. Aligning the image beam 142 with respect to the vertical position 514 consists of determining the location where the image of the target base 212 of the alignment target 200 appears on the photosensor 336. As previously described, the base beam 136 is an image of the target base 212 and is imaged by the base photodetector 362. The processor 170 will determine the location of the base photodetector 362 on the photosensor 336. The locations of other objects intersected by the image beam 142 are determine by the distance from the image of the target base 212 to the image of the objects on the photosensor 336. An example of determining the vertical position 514 of an object is described in detail below.

FIG. 5 is a top view of the imaging apparatus 300, illustrating the alignment target 200 and the image beam 142. FIG. 5 is used to illustrate the association between the alignment target 200 and the image beam 142 with reference to the transverse position 512. The housing of the imaging apparatus 300 and the media handler have been removed from the illustration of FIG. 5 in order to better illustrate the association between the alignment target 200 and the image beam 142. The image beam 142 may, for the purpose of the alignment, be interpreted as being an infinitely narrow line when viewed from the top view of FIG. 5. As described above, the image beam 142 may intersect target base 212 of the alignment target 200 at the base point 252. The distance between the base point 252 and the target vertex 220 measured along an axis defined by the target base 212 is the base distance 254. The transverse position 512 of the image beam 142 will be referenced as being located the base distance 254 from the vertex 220 of the alignment target 200 when measured at the target distance 234.

Having thus described the components pertaining to the alignment of the image beam 142, a process of aligning the image beam 142 will now be described in detail. The following alignment process is illustrated by the flow chart of FIG. 6. In summary, the location of the image beam 142, FIG. 2, will be determined with reference to the alignment target 200. The transverse position 512 will be referenced by the location where the image beam 142 intersects the target base 212 of the alignment target 200. Specifically, the image beam 142 will be referenced as being located the base distance 254 from the vertex 220 of the alignment target 200. The vertical position 514 will be referenced by the location on the photosensor 336 where the image of the target base 212 appears. As previously set forth, the alignment target 200, FIG. 1, is located at a predetermined location on the lip 732 of the media handler 700, thus, when the image beam 142 is aligned relative to the alignment target 200, the image beam 142 is readily aligned to the media handler 700.

Referring again to FIG. 2, the alignment process commences with the imaging apparatus 300 generating an image of the alignment target 200. Imaging the alignment target 200, in turn, commences by the light source 110 emitting the incident beam 122, which follows the incident light path 120 from the light source 110 to the alignment target 200. The incident beam 122, thus, illuminates the alignment target 200. The frequency of the incident beam 122 emitted by the light source 120 is in the frequency band that will pass through the window 332 and is best able to be converted to image data by the photosensor 336. The incident beam 122 illuminating the alignment target 200 causes the reflection light beam 132 to reflect from the alignment target 200. The reflection light beam 132 is a constituent of the image beam 142 and is an image of the scan line portion 232 of the alignment target 200, which includes the hypotenuse point 250 and the base point 252. The image beam 142, thus, includes an image of the scan line portion 232 of the alignment target 200 as well as images of scan line portions of other objects intersected by the image beam 142. The portion of the image beam 142 constituting the reflection light beam 132 is brighter than other areas of the image beam 142 because the alignment target 200 has been illuminated and the surface 230 of the alignment target 200 is reflective. The intensity of the portion of the image beam 142 constituting the reflection light beam 132 is also uniform because the reflectivity of the surface 230 of the target 200 is substantially uniform.

The image beam 142, including the reflected light beam 132, follows the image light path 140 to the imaging apparatus 300. The image beam 142 passes through the opening 330 in the front side 312 of the imaging apparatus 300 and into the housing 310. The image beam 142 then passes through the window 332 and is focused by the lens 334 onto the array 354 of photodetectors 356. The base beam 136 extends from the base point 252 to the base photodetector 362 and, thus, the base point 252 is imaged by the base photodetector 362. The hypotenuse beam 134 extends from the hypotenuse point 250 to the hypotenuse photodetector 364 and, thus, the hypotenuse point 250 is imaged by the hypotenuse photodetector 364. The image of the scan line portion 232 of the alignment target 200, thus, extends on the target photodetectors 372 from the base photodetector 362 to the hypotenuse photodetector 364. Therefore, the target photodetectors 372 will receive a higher and more uniform intensity of light than the remaining photodetectors 356 in the array 354. The target photodetectors 372 will, thus, output image data corresponding to the relatively high and uniform intensity of light, e.g., the photodetectors will output relatively high and equal voltages. The photosensor 336 outputs the image data of all the photodetectors 356, including the target photodetectors 372, to the processor 170 via the image data line 172.

The processor 170 analyzes the image data from the photosensor 336 and uses the image data to align the image beam 142. Aligning the image beam 142 involves determining the transverse position 512 and the vertical position 514 of the image beam 142 relative to the alignment target 200. The processor 170 may first determine if image data corresponding to the scan line portion 232 of the alignment target 200 is present in the image data. Specifically, the processor 170 may compare the image data to predetermined data to determine if a sequence of photodetectors imaged the scan line portion 232 of the alignment target 200. The sequence of photodetectors will thus correspond to the target photodetectors 372.

The processor 170 may first determine whether the image data contains data corresponding to a sequence of photodetectors that imaged approximately equal intensities of light throughout the sequence. Photodetectors that image approximately equal intensities of light are indicative of the target photodetectors 372 that imaged the reflectively uniform alignment target 200. If such a sequence exists in the image data, the processor 170 may then compare the intensities of light received by the sequence of photodetectors to a predetermined value. The predetermined value corresponds to the image data the photodetector 356 are expected to output when they receive reflected light 132 from the alignment target 200. If the image data from the sequence of photodetectors is not approximately equal to the predetermined value, the processor 170 will determine that the sequence of photodetectors did not image the alignment target 200. If the image data from the sequence of photodetectors corresponds to the correct light intensity, the processor 170 will analyze the image data to determine if the sequence of photodetectors is in the correct location on the photosensor 336 to correspond to an image of the alignment target 200. Specifically, the processor 170 will compare the location of the sequence of photodetectors on the photosensor 336 to predetermined data to determine if the sequence of photodetectors is in the approximate location on the photosensor 336 to correspond to the expected location of the image of the alignment target 200. If the processor 170 determines that the location of the sequence of photodetectors on the photosensor 336 does not correspond to the expected location of the image of the alignment target 200, the processor 170 will determine that the sequence of photodetectors 356 did not image the alignment target 200. If, however, the sequence of photodetectors is in the correct location on the photosensor 336, the processor 170 may then count the number of photodetectors 356 in the sequence. The processor 170 will compare the number of photodetectors 356 in the sequence to a predetermined number that corresponds to the length 222 of the height 214 of the calibration target 200, FIG. 3. If the number of photodetectors 356 in the sequence is less than the predetermined number, the processor 170 will conclude that the imaging apparatus 300 imaged the alignment target 200. The aforementioned sequence of photodetectors is, thus, the group of target photodetectors 372.

When the processor 170 determines that the aforementioned sequence of photodetectors is imaging the alignment target 200, the processor 170 may align the image beam 142. The processor 170 may first align the vertical position 514 of the image beam 142 as illustrated in FIG. 4. The processor 170 determines the vertical position 514 of the image beam 142 by determining the location of the base photodetector 362 on the photosensor 336 as described above. The processor 170 determines the position of the base photodetector 362 by analyzing the image data from the photosensor 336. The base photodetector 362 is the target photodetector 372 that is closest to the first end 350 of the photosensor 336, FIG. 2. The vertical position 514 of objects imaged by the photosensor 336 may be determined relative to the base photodetector 362 by using simple triangulation. This in turn yields the vertical position 514 of the object relative to the media handler 700. An example of determining the vertical position 514 of the digital linear tape cartridge 400, FIG. 1, is described below.

The processor 170 also analyzes the image data to determine the transverse position 512 of the image beam 142 relative to the alignment target as illustrated in FIG. 5. As was described above, aligning the image beam 142 with reference to the transverse position 512 consists of determining the base distance 254 on the alignment target 200. The base distance 254 is the distance between the image beam 142 and the vertex 220 of the alignment target 200, which is also the distance between the base point 252 and the vertex 220. Determining the transverse position 514 of the image beam 142 commences with the processor 170 measuring the scan height 210 of the scan line 232 of the alignment target 200 as illustrated in FIG. 3. The alignment target 200 is a right triangle, therefore, the base distance 254 is equal to scan height 210 divided by the tangent of the angle θ (218). The processor 170 may, as an example, commence the process of measuring the scan height 210 by measuring the image length 366 as was illustrated in FIG. 2. The image length 366 may be measured by multiplying the number of target photodetectors 372 by the predetermined distance from the centerline of one photodetector 356 to the centerline of an adjacent photodetector 356. When the image length 366 has been measured, the scan height 210 may be calculated by using the following equation:

$$\text{Scan height } 210 = \frac{\text{Image length } 366}{\text{Magnification } (M)}$$

Other examples of measuring the length of a scan line portion of an object are disclosed in the following U.S. patent applications: Ser No. 09/290,926 of Gardner et al. for AUTOMATED OPTICAL DETECTION SYSTEM AND METHOD, concurrently filed herewith, which is hereby incorporated by reference for all that is disclosed therein; Ser. No. 09/291,242 of Gardner et al., previously referenced; and Ser. No. 09/290,807 of Gardner et al., previously referenced.

Having thus described the automated media exchanger 100, FIG. 1, and a method of aligning the image beam 142, the automated media exchanger 100 will now be described locating the digital linear tape cartridge 400. It is to be understood, however, that the following description of locating the digital linear tape cartridge 400 may apply to locating other objects within the automated media exchanger 100.

Figure 7:
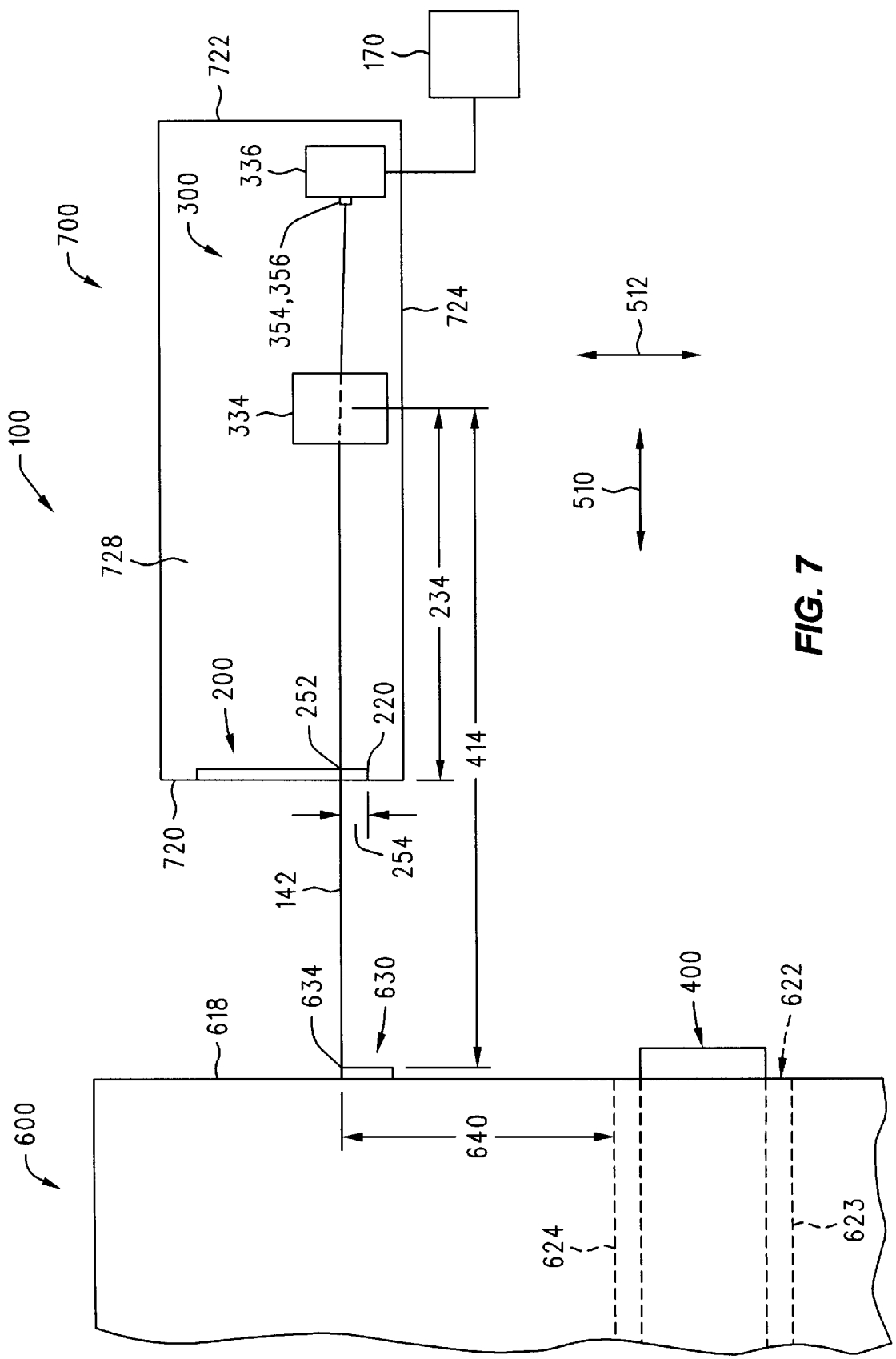
FIG. 7 is a top view of the automated media exchanger of FIG. 1 illustrating the transverse location of a guidance target relative to an alignment target.

FIG. 7 illustrates a top view of the media handler 700 and the guidance target 630 of FIG. 1. Specifically, FIG. 7 illustrates the association between the imaging apparatus 300, the media handler 700, and the guidance target 630, wherein the guidance target 630 is affixed to the front side 618 of the magazine 600. The housing of the imaging apparatus 300 has been removed from the view in order to better illustrate these associations. The height 634 of the guidance target 630 is located a transverse distance 640 from the right side 624 of the slot 622. For illustration purposes, the transverse distance 640 in this example will be assumed to be three centimeters. It is further assumed for the purpose of this example, that when the vertex 220 of the alignment target 200 is in the same transverse position 512 as the left side 623 of the slot 622, the media handler 700 is located in the correct transverse position 512 to extract the digital linear tape cartridge 400.

The imaging apparatus 300 in FIG. 7 is illustrated imaging the height 634 of the guidance target 630. The imaging apparatus 300 could image any part of the guidance target 630, however, for ease in describing the process of locating the digital linear tape cartridge 400, the height 634 has been chosen. An example of imaging other locations of a guidance target for the purpose of locating objects is described in the U.S. patent application, Ser. No. 09/291,242 of Gardner et al., previously referenced. As will be described in detail below, the media handler 700 will move in the transverse direction 512 the transverse distance 640 minus the base distance 254 in order to be in the correct transverse position 512 to extract the digital linear tape cartridge 400.

The process of locating the height 634 of the guidance target 630 commences with the media handler 700 moving in the transverse direction 512 until the imaging apparatus 300 detects the height 634. The media handler 700 may, for example, move in the transverse direction 512 to the approximate location of the height 634. The media handler 700 may then scan this location until the imaging apparatus 300 detects the height 634. The height 634 may, for example, be detected by an optical transition created by the transition from the substantially reflective guidance target 630 to the less reflective front side 618 of the magazine 600.

The base distance 254 was determined during the aforementioned alignment process. The base distance 254 is the distance between the image beam 142 and the target vertex 220 measured at the target distance 234 from the lens 334. The target distance 234 is known because the alignment target 200 is located at a predetermined location relative to the media handler 700. Referring to FIG. 3, for the purpose of this example, the angle 218 is thirty degrees and the scan height 210 has been measured at one centimeter. The base distance 254 is equal to the scan height 210 of one centimeter divided by tangent of the angle 218 of 30 degrees. The base distance 254 is thus equal to 1.73 centimeters. The media handler 700 has to move in the transverse direction 512 the transverse distance 640 of three centimeters minus the base distance 254 of 1.73 centimeters, or 1.27 centimeters, in order to be in the correct transverse position 512 to properly contact the digital linear tape cartridge 400.

Figure 8:
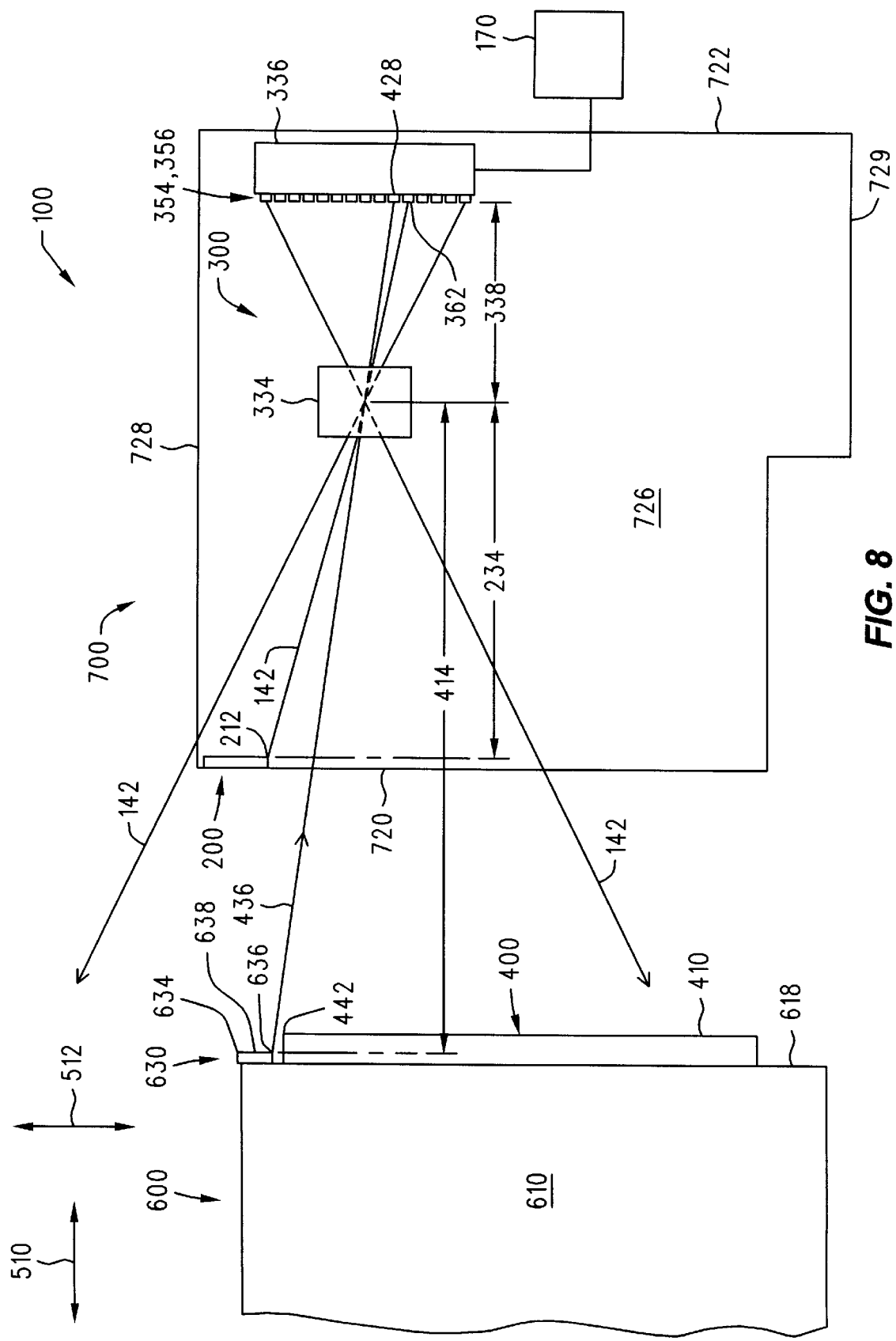
FIG. 8 is a side view of the automated media exchanger of FIG. 7 illustrating the vertical location of the guidance target relative to the alignment target.

FIG. 8 illustrates a side view of the automated media exchanger 100 being used to determine the vertical position 512 of the digital linear tape cartridge 400. Specifically, FIG. 8 illustrates using the alignment target 200 and the guidance target 630 to position the media handler 700 in the proper vertical position 514 to extract the digital linear tape cartridge 400 from the magazine 600. The housing of the imaging apparatus 300 has been removed from the view of FIG. 8 to better illustrate the association between the alignment target 200, the guidance target 630, and the imaging apparatus 300. The left side 724 of the media handler 700 illustrated in FIG. 8 is depicted as being open in order to view the components located in the media handler 700.

In this example, the media handler 700 has been moved in the plunge direction 510 so that the lens 334 is located a predetermined object distance 414 from the surface 638 of the guidance target 630. The media handler 700 has also been moved in the transverse direction 512, as previously described, so that the image beam 142 intersects the guidance target 630. An edge photodetector 428 is defined as the photodetector that images the base 636 of the guidance target 630. For the purpose of illustrating this example, it will be assumed that the media handler 700 is in the proper vertical position 512 to extract the digital linear tape cartridge 400 when the edge photodetector 428 is located 100 photodetectors from the base photodetector 362.

An edge beam 436 will be used as a reference for determining the vertical position 512 of the media handler 700 relative to the guidance target 630. The edge beam 436 extends from the base 636 of the guidance target 600 to the edge photodetector 428. The edge beam 436 is a constituent of the image beam 142 and is an image of the base 636 of the guidance target 630. For this example, the edge photodetector 428 is required to be located 100 photodetectors from the base photodetector 362 in order for the media handler 700 to be properly located in the vertical direction 514 to extract the digital linear tape cartridge 400. The media handler 700, thus, moves in the vertical direction 514 until the base photodetector 324 is located 100 photodetectors from the edge photodetector 428. When the media handler is in the proper vertical position 514 and the proper transverse position 512 to extract the digital linear tape cartridge 400, the media handler moves in the plunge direction 510 to extract the digital linear tape cartridge 400 in a conventional manner.

The automated media exchanger 100 has been described above using an alignment target 200 in the shape of a right triangle, FIG. 1. A right triangle is the preferred shape of the alignment target 200 because a single distance between a point on the base 212 and a point on the hypotenuse 216 corresponds to a single distance between the point on the base 212 and the vertex 220. The transverse location 514 of the image beam 142 may, thus, be readily established relative to the vertex 220. Additionally, the base 212 of the right triangle may be approximately normal to the image beam 142. This allows the vertical position 514 of the image beam 142 to be aligned to the base 212 of the right triangle regardless of the transverse position 512 of the image beam 142.

Figure 9:
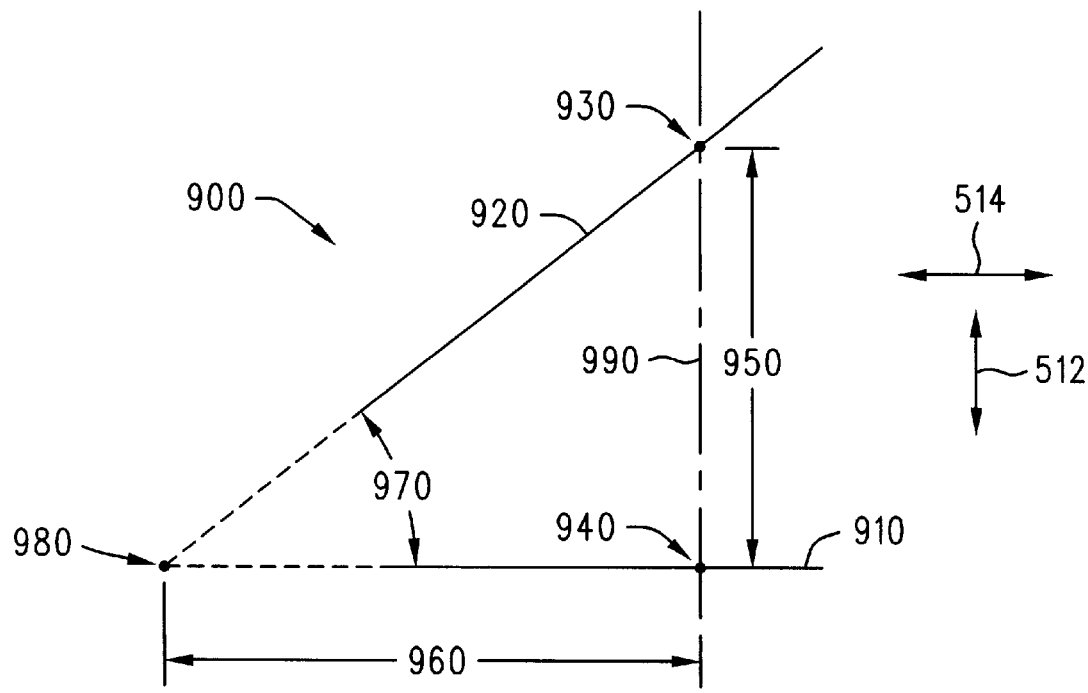
FIG. 9 is a schematic illustration of two lines being used as an alignment target.

FIG. 9, as an alternative, illustrates an alignment target 900 in the form of two lines. The alignment target 900 may comprise two lines depicted as a base line 910 and a hypotenuse line 920. The target 900 is similar to a right triangle where the base line 910 corresponds to the triangle base and the hypotenuse line 920 corresponds to the triangle hypotenuse. The lines 910 and 920 may be located at predetermined locations relative to an imaging apparatus, not shown in FIG. 9. The lines 910 and 920, if extended, may intersect at a vertex 980 to form an angle θ, depicted numerically as 970. The image beam may intersect the alignment target 900 to form a scan line 990. The scan line 990 may intersect the base line 910 at a base point 940 and at approximately a right angle. The scan line 990 may also intersect the hypotenuse line 920 at a hypotenuse point 930. The distance between the hypotenuse point 930 and the base point 940 may be a scan height 950. The scan line 990 may be located in the transverse direction 512 a base distance 960 from the vertex 980. Aligning the image beam in the transverse direction 512 consists of determining the base distance 960. As with the right triangle, the base distance 960 is equal to the scan height 950 divided by the tangent of the angle θ. The image beam may be aligned in the vertical direction 514 as previously set forth by determining the location of the photodetector, not shown, that images the base line 910.

The alignment target 900 may be used in situations where it is difficult to distinguish an alignment target from other objects located in the image beam 990. The image data corresponding to the alignment target 900 will be two areas of high light intensity separated by an area of low light intensity. The high light intensity corresponds to the base line 910 and the hypotenuse line 920. The area of low light intensity corresponds to the area between the base line 910 and the hypotenuse line 920. The processor may be able to identify this light pattern, which may distinguish the alignment target 900 from other objects located in the image beam 990.

Figure 10:
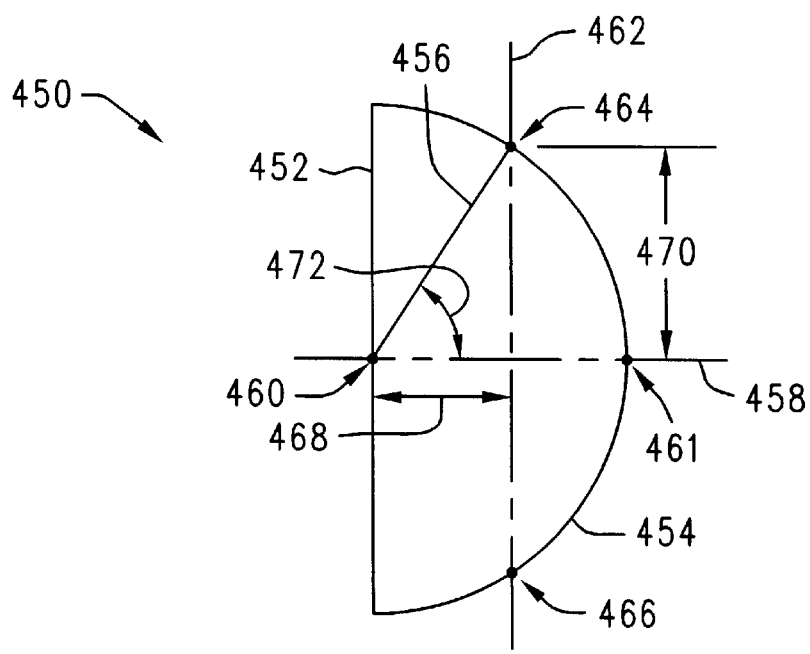
FIG. 10 is a schematic illustration of a semicircle being used as an alignment target.

FIG. 10 illustrates an alignment target 450 in the shape of a semicircle. The alignment target 450 may have a diameter 452 and a circumference 454. The alignment target 450 may have a radius 456, which may be a unit value. An axis 458 may intersect the diameter 452 at a midpoint 460. The axis 458 may be perpendicular to the diameter 452 and may intersect the circumference 454 at a midpoint 461. An image beam 462 may intersect the circumference 454 at a first point 464 and at a second point 466. The image beam 462 may intersect the axis 458 at a base distance 468 from the midpoint 460 of the diameter 452. The alignment target 450 may be located so that the midpoint 460 of the diameter 452 is at a predetermined location. The image beam 462 may, thus, be aligned in the transverse direction 514 as being located the base distance 468 from the midpoint 460 of the diameter 452.

The alignment of the image beam 452 consists of determining the base distance 468, which will determine the transverse location 514 of the image beam 462 relative to the diameter 452. A processor, not shown in FIG. 10, determines the distance between the first point 464 and the second point 466. One half the distance between the first point 464 and the second point 466 may be designated as a height 470. A right triangle consisting of the radius 456, the base distance 468, and the height 470 may be created as a reference to determine the base distance 468. The right triangle may have an angle θ, depicted numerically as 472, between the radius 456 and the height 470. The angle θ is equal to the inverse cosine of the height 470 divided by the radius 456. The base distance 468 is then equal to the cosine of the angle θ multiplied by the radius 456. As previously set forth, the location of the scan line 462 may be the base distance 468 from the midpoint 460. The image beam 462 may be aligned in the vertical position by determining a reference on the photosensor, not shown, where the axis 458 would be imaged. This location on the photosensor is centrally located between the photodetector that images the first point 464 and the photodetector that images the second point 466.

The alignment target 450 provides a nonlinear correlation between the scan height 470 and the base distance 468. This nonlinearity may be used to provide a more precise alignment of the image beam as the location of the image beam 462 approaches the midpoint 461.

The alignment target 200, FIG. 1, may provide additional information to the processor 170 regarding the status of the media handler 700 in addition to the location of the image beam 142. When a digital linear tape cartridge is located within the media handler 700, the image beam 142 is blocked and the imaging apparatus 300 is, thus, unable to generate an image of the alignment target 200. If the imaging apparatus 300 is not able to generate an image of the alignment target 200, the processor 170 may determine that a digital linear is occupying the media handler 700. This information may be useful if the automated media exchanger 100 is being used during a power disruption. When power is returned to the automated media exchanger 100, the processor 170 is quickly able determine whether a digital linear tape cartridge is located within the media handler 700.

Another embodiment of the automated media exchanger 100, FIG. 1, has the imaging apparatus 300 located in the vicinity of the corner 740 of the media handler 700. The image light path 140 may pass through the opening 730 in front side 720 of the media handler 700 and to the imaging apparatus 300. The physical characteristics of the media handler 700 may cause the image light path 140 to be oriented so that it enters the opening 730 in the approximate location of the center of the opening 730. The image light path 140 may then extend to the left side 724 of the media handler 700 to the location of the imaging apparatus 300. The image light path 140, however, may be best oriented so that it enters the imaging apparatus on a path that is parallel to the left side 724. This orientation may require that the image light path 140 be offset in order for the image light path 140 to be able to be parallel to the left side 724 of the media handler 700. Optical devices, not shown, may be required to be located in the media handler 700 to offset the image light path 140. Offsetting an image light beam within a media handler is disclosed in the U.S. patent application, Ser. No. 09/290,842 of Gardner et al., previously referenced. The image beam 142, as illustrated in FIG. 1, has not been offset.

An alternative embodiment of the imaging apparatus 300 may comprise a lens and a photosensor mounted to a simple support structure. The support structure may be located in the media handler 700, FIG. 1, in a similar manner as was described for the imaging apparatus 300. This embodiment of an imaging apparatus may be more economical when the imaging apparatus is used in the automated media exchanger 100. The automated media exchanger 100 may be a sealed unit, thus, contaminants may be prevented from entering the automated media exchanger. The imaging apparatus, thus, may not require a housing or a window as was described with the imaging apparatus 300. Another embodiment of an imaging apparatus that may be used in the automated media exchanger 100 converts a two-dimensional image of an object to image data. Such an imaging apparatus may, for example, comprise a photosensor having a two-dimensional array of photodetectors rather than a linear array as described above.

The processor 170 has been described herein as being used to align the image beam 142. It is to be understood, however, that the imaging apparatus 300 and the processor 170 may be used to decipher bar codes. A method of deciphering bar codes is described in the U.S. patent application, Ser. No. 09/290,428 of Kato et al. for METHOD OF DECIPHERING BAR CODES, concurrently filed herewith, which is hereby incorporated by reference for all that is disclosed therein.

The alignment system has been described herein with reference to an automated media exchanger. It is to be understood, however, that the description of the alignment system used in an automated media exchanger is for illustration purposes only and that the alignment system may be applicable to other optical systems.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A system for determining the position of a light path associated with an imaging apparatus relative to an object, said system comprising:

a target mounted to said object;

said target comprising a first edge and a second edge, said first edge and said second edge defining boundaries of reflective difference, wherein a first axis intersects said first edge at a first point and said second edge at a second point, and wherein the distance between said first point and said second point corresponds to a location on a second axis;

wherein said imaging apparatus includes at least one photosensor and at least one optical component located along said light path;

wherein said imaging apparatus is mounted to said object; and wherein said light path intersects said target along said first axis.

2. The system of claim 1 wherein said imaging apparatus is of the type comprising a photosensor, said photosensor comprising a linear array of photodetectors wherein each of said photodetectors has a centerline and wherein said photodetectors are spaced a predetermined distance from the centerline of one photodetector to the centerline of an adjacent photodetector.

3. The system of claim 1 further comprising a processor, wherein said processor is operatively connected to said imaging apparatus.

4. The system of claim 3 wherein said processor is adapted to receive data from said photosensor, and said processor is programmed to distinguish between data that represents the image of said first edge of said target and data that represents the image of said second edge of said target from other data received from said photosensor.

5. The system of claim 3 wherein said processor is programmed to measure the distance between a first point on said target first edge and a second point on said target second edge along said first axis.

6. The system of claim 1 wherein said target comprises a surface, and wherein said surface is bordered by said first edge and said second edge.

7. The system of claim 6 wherein said surface is substantially reflective.

8. The system of claim 6 wherein said the reflectivity of said surface is substantially uniform.

9. The system of claim 1 wherein said target comprises two lines, wherein the first of said two lines is said first edge, and wherein the second of said two lines is said second edge.

10. The system of claim 1 wherein said target is a semicircle, said semicircle comprising a circumference, wherein said circumference has a first end, a second end, and a midpoint, said first edge of said guidance target being a section of said semicircle extending between said first end and said midpoint along said circumference, and said second edge of said alignment target being a section of said semicircle extending between said midpoint and said second end along said circumference.

11. The system of claim 1 wherein said target is a right triangle, said right triangle having a base, a height, and a hypotenuse, wherein said base is perpendicular to said height, and wherein said first edge corresponds to said base and said second edge corresponds to said hypotenuse.

12. The system of claim 1 further comprising a light source associated with said target.

13. The system of claim 1 wherein said object is a picker device of the type used in a media handling device.

14. A method of determining the position of a first object relative to a second object, said method comprising:

providing an optical indicium associated with said first object;

providing an imaging apparatus associated with said first object, said imaging apparatus including at least one photosensor and at least one optical component located along a light path extending between said optical indicium and said at least one photosensor;

producing a first image of said optical indicium with said imaging apparatus;

performing a first analysis of said first image;

determining the alignment of said light path relative to said first object based upon said first analysis;

producing a second image of at least a portion of said second object by intersecting said at least a portion of said second object with said light path;

performing a second analysis of said second image;

determining the position of said first object relative to said second object based upon said second analysis and based upon said alignment.

15. The method of claim 14 wherein said performing a first analysis comprises making a measurement of said first image of said optical indicium along a first axis.

16. The method of claim 15 wherein said determining the alignment of said light path comprises determining the alignment of said light path along a second axis which is different from said first axis.

17. The method of claim 16 wherein said first axis is substantially perpendicular to said second axis.

18. The method of claim 15 wherein said determining the alignment of said light path comprises determining the alignment of said light path along a second axis and a third axis which are different from said first axis.

19. The method of claim 18 wherein said first axis is substantially parallel to said third axis.

20. The method of claim 14 wherein said first object is moveable relative to said second object.

21. The method of claim 14 wherein said first object is a picker device of the type used in a media handling device.

22. The method of claim 14 wherein said second object is a component comprising a media handling device.

23. The method of claim 14 wherein said second object is a media holding device of the type used in a media handling device.

24. The method of claim 14 wherein said providing an optical indicium comprises providing an optical indicium fixedly attached to said first object.

25. The method of claim 14 wherein said providing an imaging apparatus comprises providing said imaging apparatus fixedly attached to said first object.

26. The method of claim 14 wherein said optical indicium comprises a first edge and a second edge, said first edge and said second edge defining boundaries of reflective difference, wherein a first axis intersects said first edge at a first point and said second edge at a second point, and wherein the distance between said first point and said second point corresponds to a location on a second axis.

27. The method of claim 26 wherein said optical indicium comprises two lines, wherein the first of said two line is said first edge, and wherein the second of said two lines is said second edge.

28. The method of claim 26 wherein said optical indicium is a semicircle, said semicircle comprising a circumference, wherein said circumference has a first end, a second end, and a midpoint, said first edge of said guidance target being a section of said semicircle extending between said first end and said midpoint along said circumference, and said second edge of said alignment target being a section of said semicircle extending between said midpoint and said second end along said circumference.

* * * * *